(12) United States Patent
Cherukuri

(10) Patent No.: US 10,459,534 B2
(45) Date of Patent: Oct. 29, 2019

(54) SYSTEM AND METHOD FOR LARGE DATA AUGMENTED REALITY APPLICATIONS ON SMARTGLASSES

(71) Applicant: ThirdEye Gen, Inc, Princeton, NJ (US)

(72) Inventor: Nikhil Cherukuri, Cranbury, NJ (US)

(73) Assignee: THIRDEYE GEN, INC., Princeton, NJ (US)

( * ) Notice: Subject to any disclaimer, the term of this patent is extended or adjusted under 35 U.S.C. 154(b) by 188 days.

(21) Appl. No.: 15/649,782

(22) Filed: Jul. 14, 2017

(65) Prior Publication Data

US 2019/0018505 A1    Jan. 17, 2019

(51) Int. Cl.
| | |
|---|---|
| *G06F 3/0346* | (2013.01) |
| *G02B 27/01* | (2006.01) |
| *H04N 19/20* | (2014.01) |
| *H04N 7/14* | (2006.01) |
| *H04N 7/15* | (2006.01) |

(52) U.S. Cl.
CPC ....... *G06F 3/0346* (2013.01); *G02B 27/0101* (2013.01); *G02B 27/0176* (2013.01); *H04N 7/142* (2013.01); *H04N 7/15* (2013.01); *H04N 19/20* (2014.11); *G02B 2027/0138* (2013.01); *G02B 2027/0178* (2013.01)

(58) Field of Classification Search
CPC .............. G06F 3/0346; G02B 27/0101; G02B 27/0176; G02B 2027/0178; G02B 2027/0138; H04N 19/20
See application file for complete search history.

(56) References Cited

U.S. PATENT DOCUMENTS

| 8,235,529 B1 | 8/2012 | Raffle et al. |
| 9,285,592 B2 | 3/2016 | Olsson et al. |
| 2004/0181550 A1* | 9/2004 | Warsta ................. H04L 51/066 |
| 2008/0009275 A1* | 1/2008 | Werner ............. A63B 24/0062 455/414.2 |
| 2009/0185792 A1* | 7/2009 | Braunstein ............... H04N 5/77 386/239 |
| 2013/0044042 A1 | 2/2013 | Olsson et al. |
| 2013/0103726 A1* | 4/2013 | Tjin ....................... G06F 16/29 707/827 |

(Continued)

FOREIGN PATENT DOCUMENTS

WO    2016073185 A1    5/2016

*Primary Examiner* — Stella L. Woo
(74) *Attorney, Agent, or Firm* — Meagher Emanuel Laks Goldberg & Liao, LLP

(57) ABSTRACT

An augmented reality system for communication between a plurality of user devices. The system includes a wearable device with a headset, controller, display, camera, earphone and microphone. The controller has a local memory with a maximum video file size. The camera records video data for storage in the local memory. A server is configured for data communication with the plurality user devices, the server has a server memory and plurality of user accounts. The server is configured to establish data connection between the wearable device and at least one other user device. A video management located is configured to determine whether the video data stored in the local memory equals the maximum video file size and in this event, the video management engine is configured to transfer the video data to the server for storage in the server memory and delete the video data from the local memory.

24 Claims, 17 Drawing Sheets

(56) References Cited

U.S. PATENT DOCUMENTS

Figure 1A:
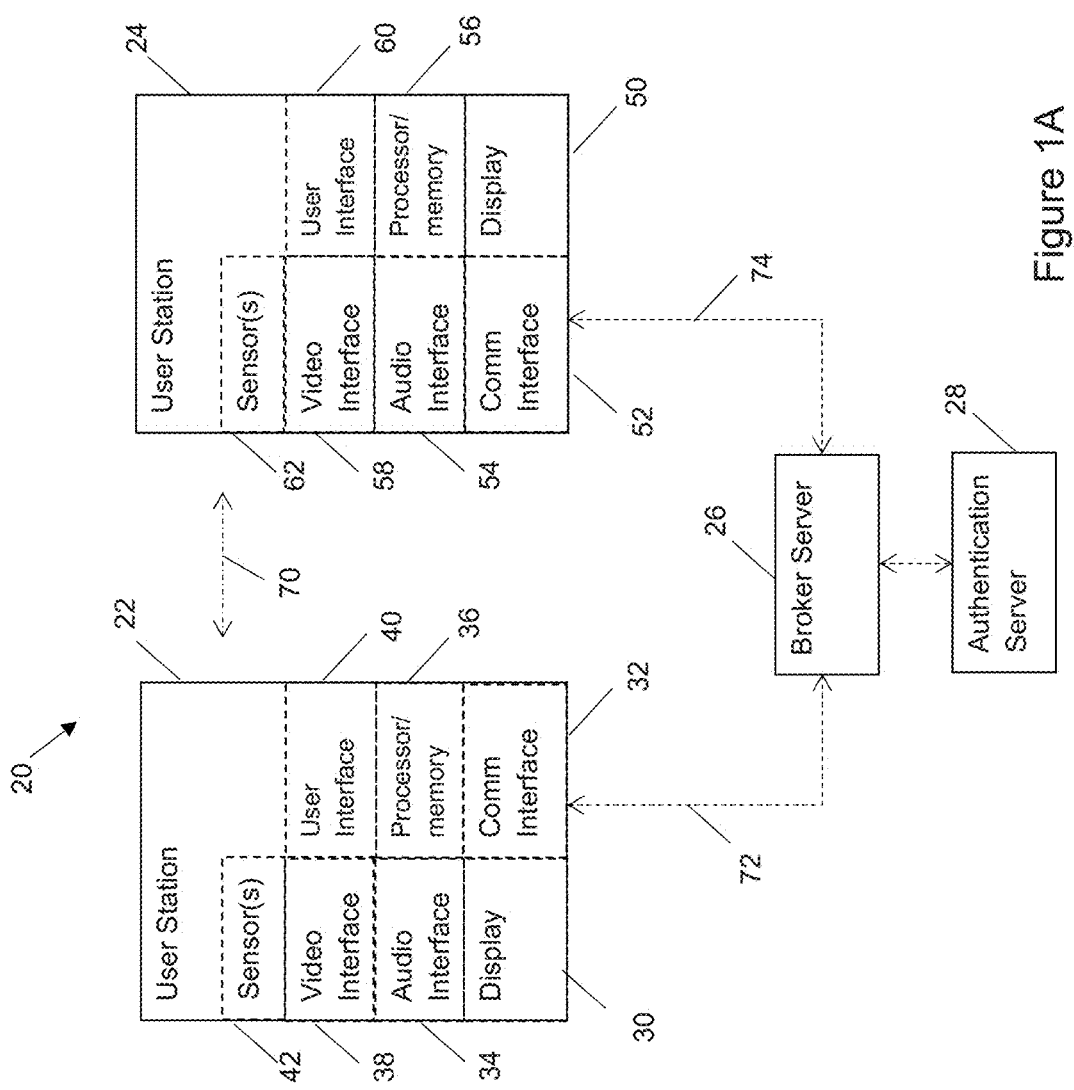

| | | | |
|---|---|---|---|
| 2013/0242262 A1* | 9/2013 | Lewis | G02B 27/0093 351/209 |
| 2016/0267806 A1* | 9/2016 | Hsu | G09B 19/24 |
| 2016/0291922 A1 | 10/2016 | Montgomerie et al. | |
| 2017/0185716 A1* | 6/2017 | Rodriguez | G06F 19/3418 |
| 2017/0185738 A1* | 6/2017 | Moharir | H04N 9/8042 |
| 2017/0337738 A1* | 11/2017 | Kepner | G06T 17/05 |
| 2018/0068577 A1* | 3/2018 | Javanbakht | G09B 5/14 |
| 2019/0082137 A1* | 3/2019 | Waniguchi | H04N 9/802 |

* cited by examiner

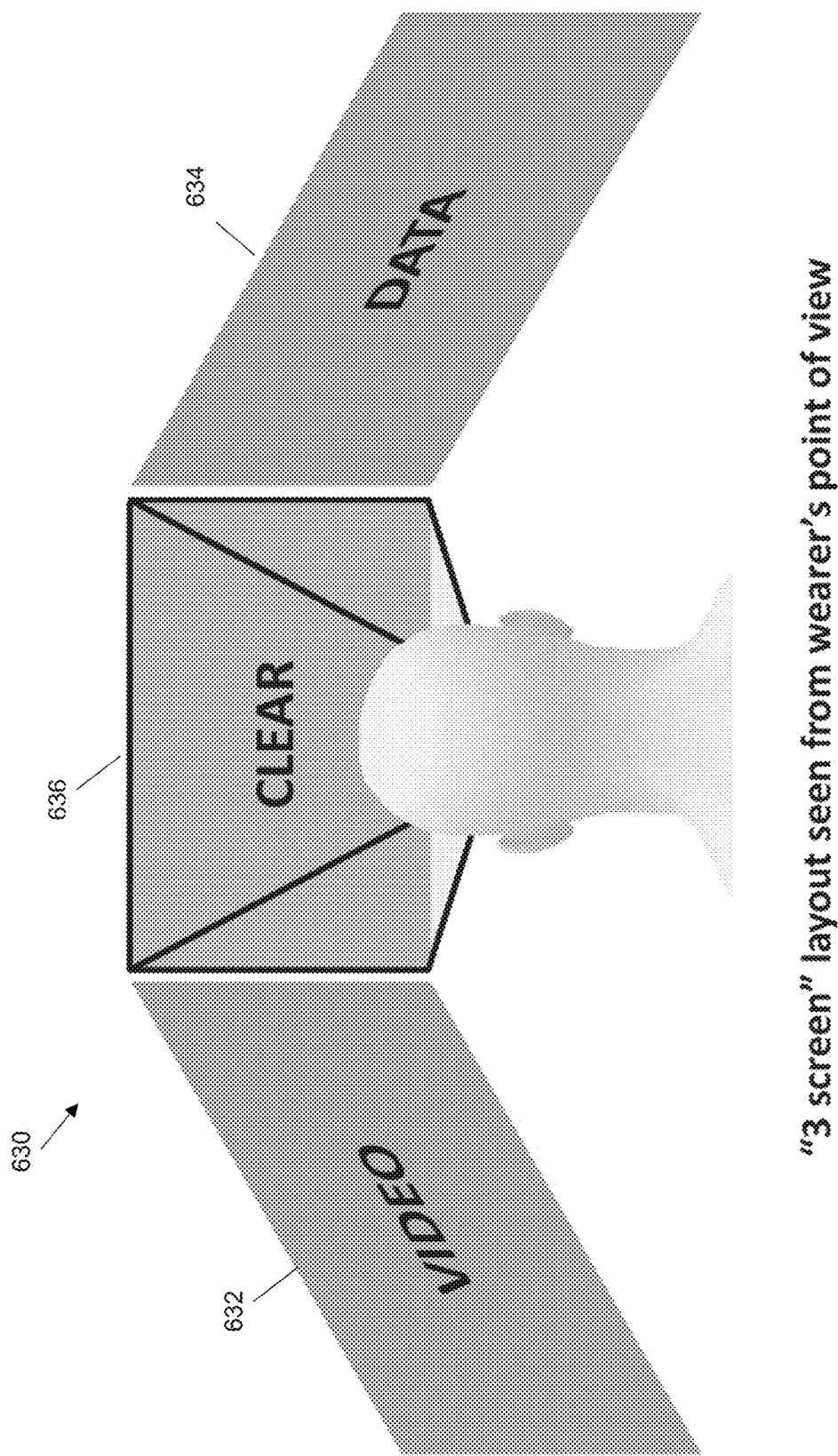

The rightmost screen displays (annotated) images and data sent from remote person

SYSTEM AND METHOD FOR LARGE DATA AUGMENTED REALITY APPLICATIONS ON SMARTGLASSES

FIELD OF THE INVENTION

The present disclosure generally relates to Augmented Reality (AR) systems that allows for multiple users to use AR headsets or smartglasses to communicate via real-time, Point of View streaming with a wide range of annotated AR information being displayed onto the user's field of view.

BACKGROUND

Augmented reality (AR) generally refers to live, direct or indirect, viewing of a physical, real-world environment containing elements that are augmented (or supplemented) by computer-generated imagery. For example, information about the real world physical environment can be obtained and displayed as an information layer which can be overlaid on the live view and interacted with by a user. The current Augmented Reality software market is mostly geared toward developing apps for tablets/phones (i.e. Augment for the iPhone). This is because phones have much bigger market presence than AR headsets and thus more developer focus. The AR headset market is still at a nascent stage with very few apps that utilize the unique advantages of AR hardware. Despite strong potential and interest in AR systems, AR systems for streaming video between users that provide for real time streaming and annotation have not been generally available.

SUMMARY OF THE INVENTION

An augmented reality system for communication between a plurality of user devices including wearable devices and non-wearable user stations is disclosed. The system includes a wearable device including a headset and a controller, the headset having a display, camera, earphone and microphone, the controller being configured with a local memory having a maximum video file size, the camera being configured to record video data and store the video data in the local memory. The system also includes a server configured for data communication with the plurality user devices, the server having a server memory and plurality of user accounts, each user account being associated with at least one of the plurality of user devices, the server being configured to establish data connection between the wearable device and at least one other user device. A video management engine is located on the controller, the video management engine being configured to determine whether the video data stored in the local memory equals the maximum video file size and in this event, the video management engine being configured to transfer the video data to the server for storage in the server memory and then delete the video data from the local memory.

The system may also include an authentication server configured to authenticate users. The user station may have a separate computing platform including at least one of a personal digital assistant (PDA), smart phone, tablet, laptop or desktop computer. The wearable device may include at least one sensor configured to generate sensor data based on movement of the headset. The system may include a sensor management engine located on the controller, the sensor management engine being configured to manipulate an image on the display based on the sensor data.

The system may include an image management engine located on the controller, the server being configured to transfer image data to the wearable device, the wearable device controller having a maximum image size, the image management engine being configured to determine if the image data exceeds the maximum image size and in this event, resize the image to less than the maximum image size. The image management engine may be configured to convert the image to base64 encoding. The image management engine may be configured to convert the base64 encoded image to a binary format with 8 bits per byte. The image management engine may be configured to convert the binary image into tiles. The image data may include annotations. The server may be configured to support one-way communication between user devices. The server may be configured to support two-way communication between user devices. The server may include a database associated with each user for storage of the video data and image data.

A method for augmented reality communication between a plurality of user devices including wearable devices and non-wearable user stations is also disclosed. The method includes providing a wearable device including a headset and a controller, the headset having a display, camera, earphone and microphone, the controller being configured with a local memory having a maximum video file size, the camera being configured to record video data and store the video data in the local memory. The method also includes providing a server configured for data communication with the plurality user devices, the server having a server memory and plurality of user accounts, each user account being associated with at least one of the plurality of user devices, the server being configured to establish data connection between the wearable device and at least one other user device. The method also includes providing a video management engine located on the controller, the video management engine being configured to determine whether the video data stored in the local memory equals the maximum video file size and in this event, the video management engine being configured to transfer the video data to the server for storage in the server memory and then delete the video data from the local memory.

The method may also include providing an authentication server configured to authenticate users. The user station may have a separate computing platform including at least one of a personal digital assistant (PDA), smart phone, tablet, laptop or desktop computer. The wearable device may include at least one sensor configured to generate sensor data based on movement of the headset. The method may include providing a sensor management engine located on the controller, the sensor management engine being configured to manipulate an image on the display based on the sensor data.

The method may include providing an image management engine located on the controller, the server being configured to transfer image data to the wearable device, the wearable device controller having a maximum image size, the image management engine being configured to determine if the image data exceeds the maximum image size and in this event, resize the image to less than the maximum image size. The image management engine may be configured to convert the image to base64 encoding. The image management engine may be configured to convert the base64 encoded image to a binary format with 8 bits per byte. The image management engine may be configured to convert the binary image into tiles. The image data may include annotations. The server may be configured to support one-way communication between user devices. The server may be configured to support two-way communication between user devices.

The server may include a database associated with each user for storage of the video data and image data.

BRIEF DESCRIPTION OF THE FIGS.

Figure 1B:
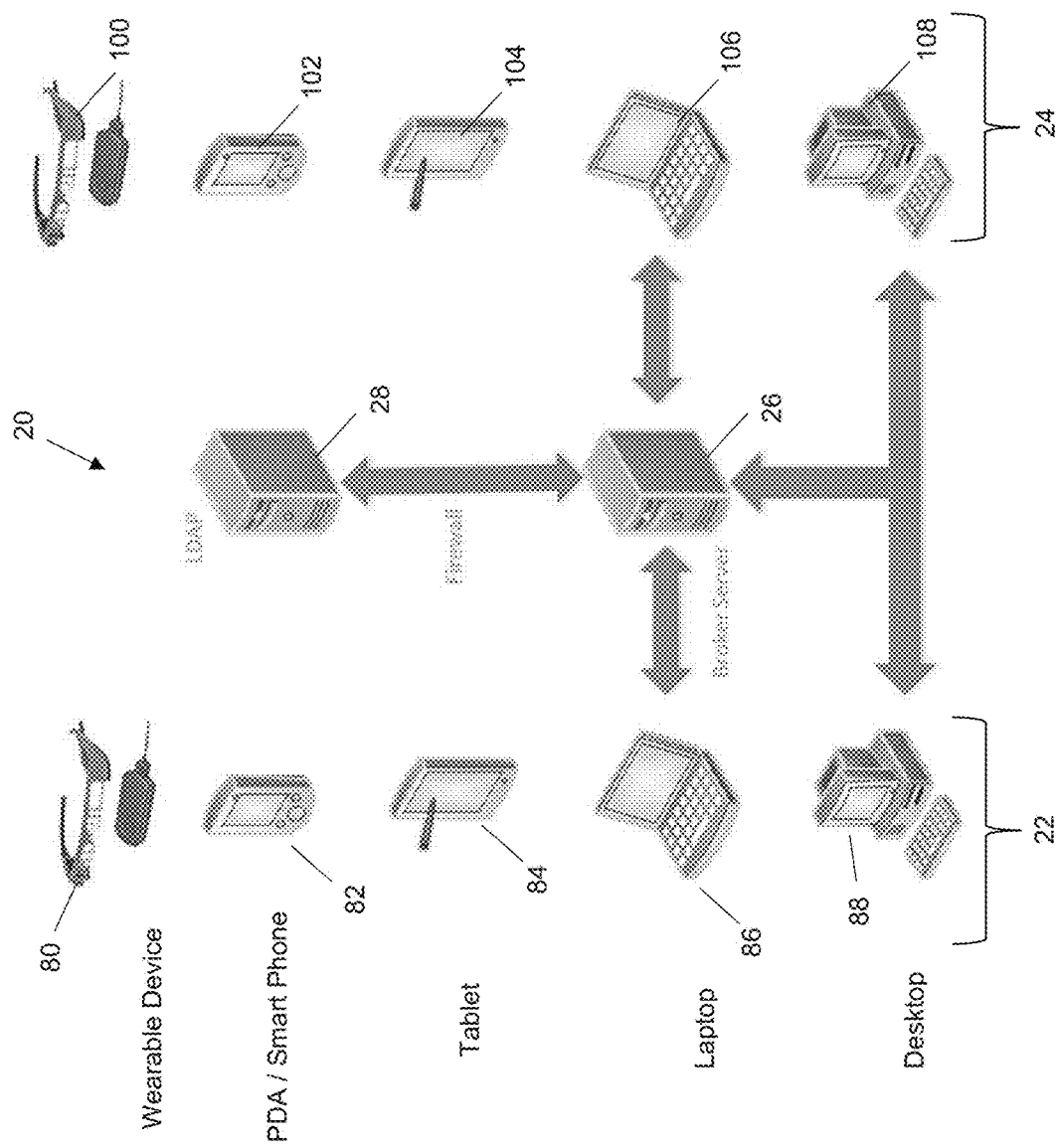
Figure 2:
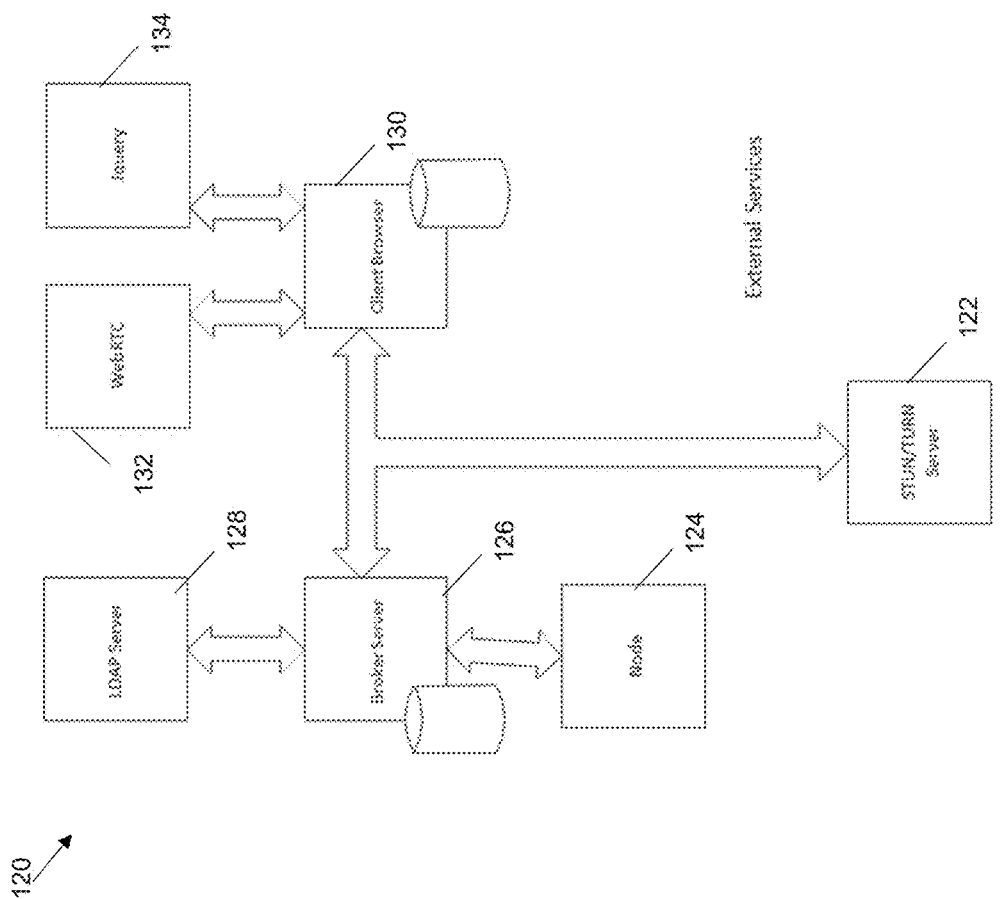
Figure 3:
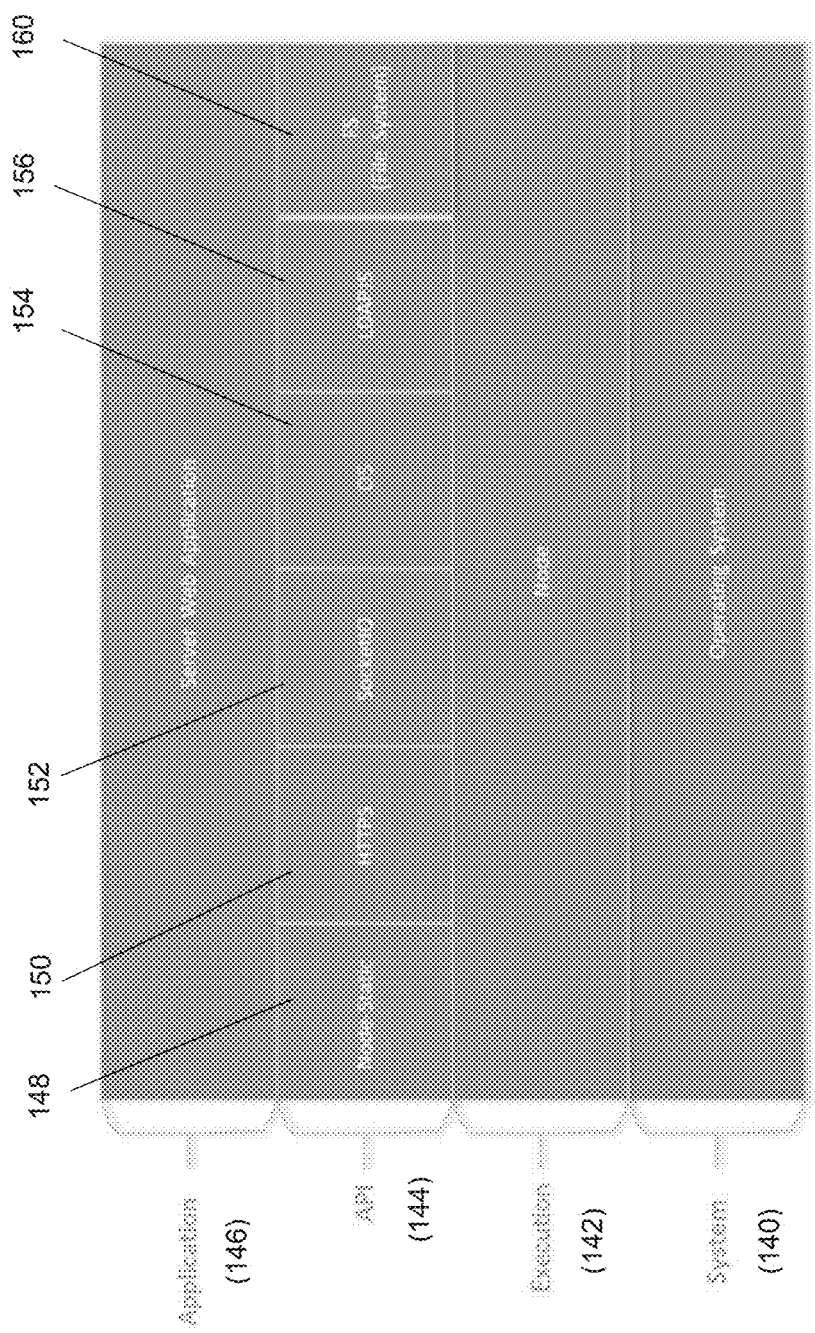
Figure 4:
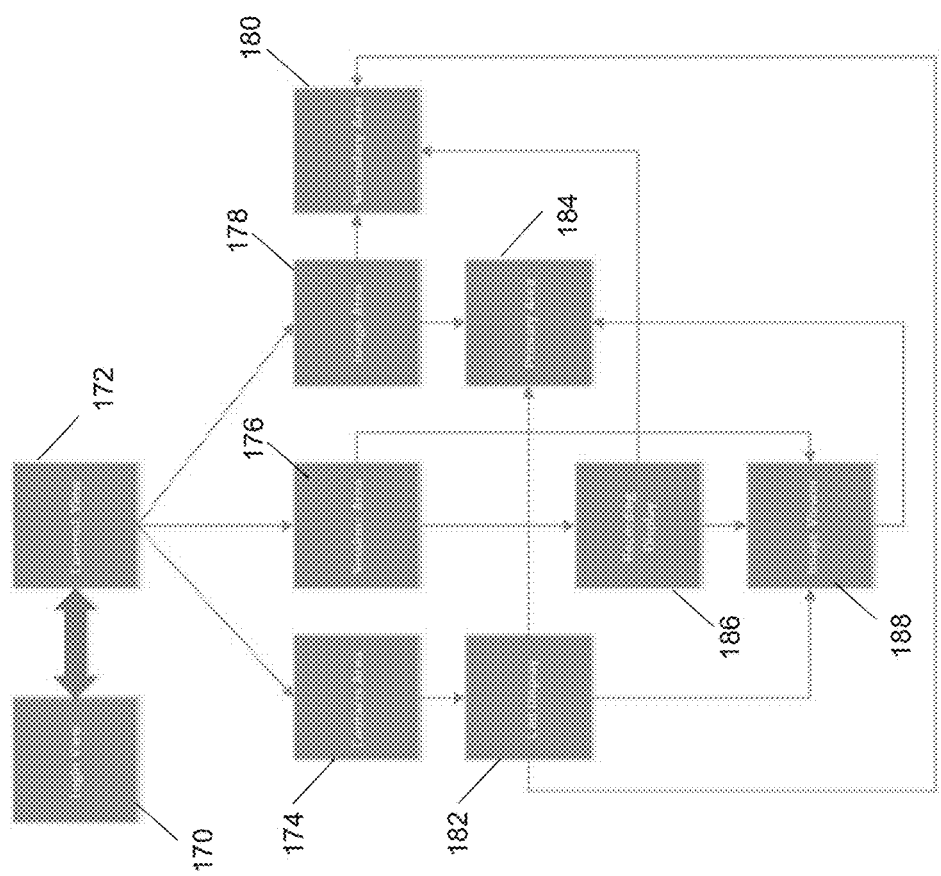
Figure 5:
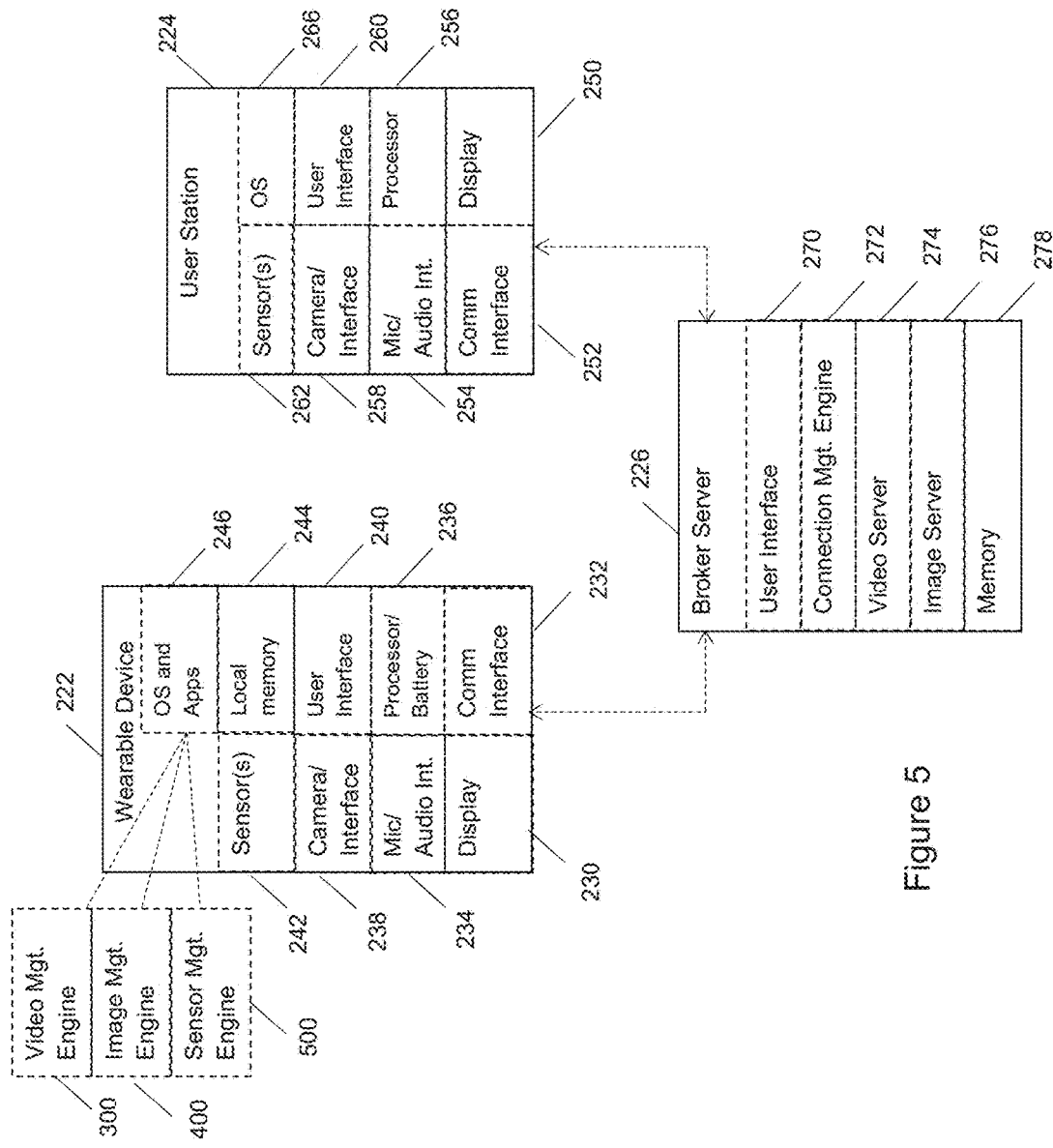
Figure 6:
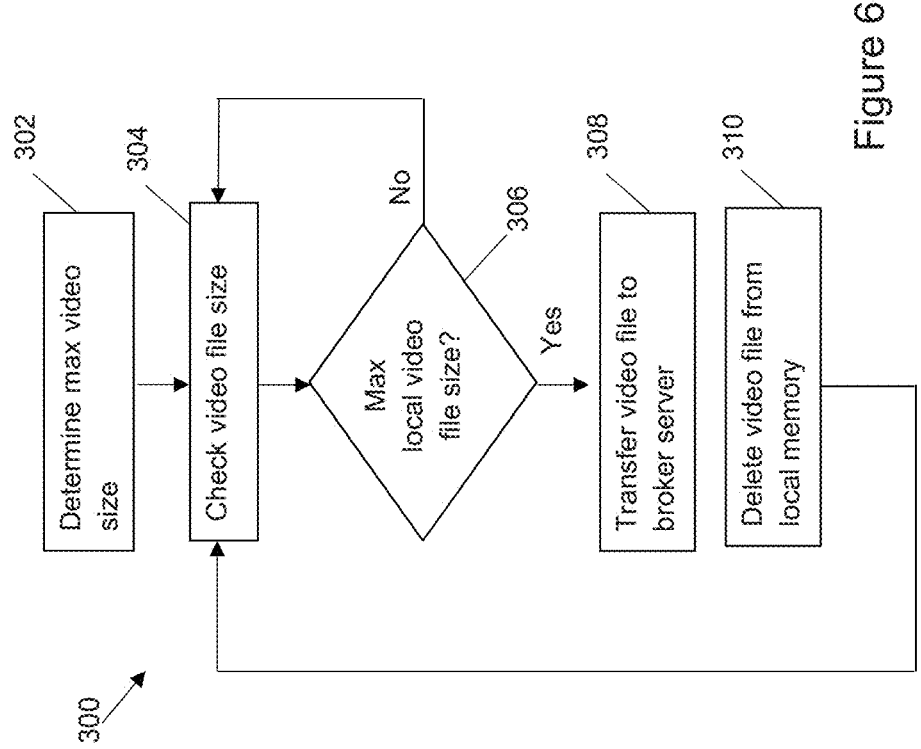
Figure 7A:
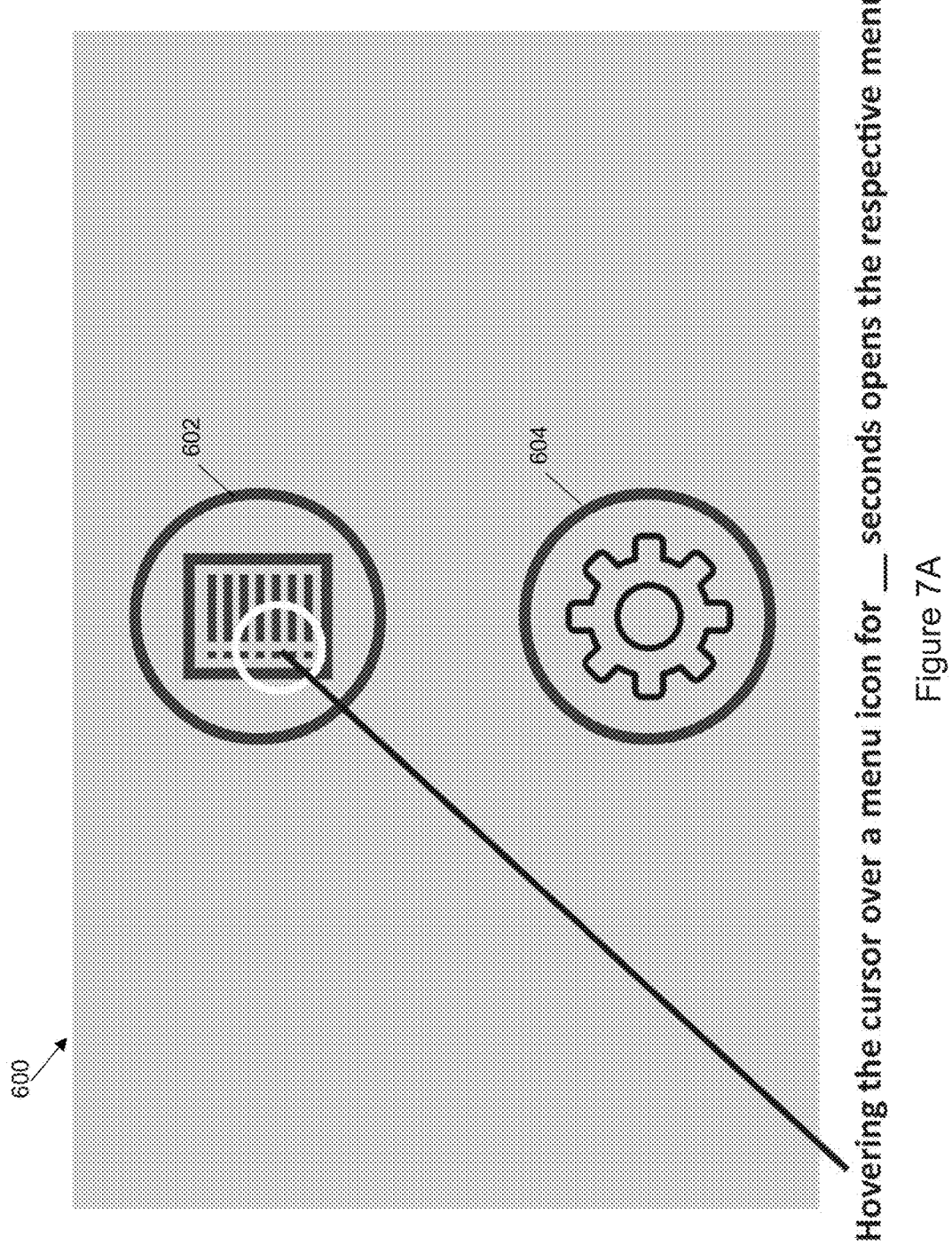
Figure 7B:
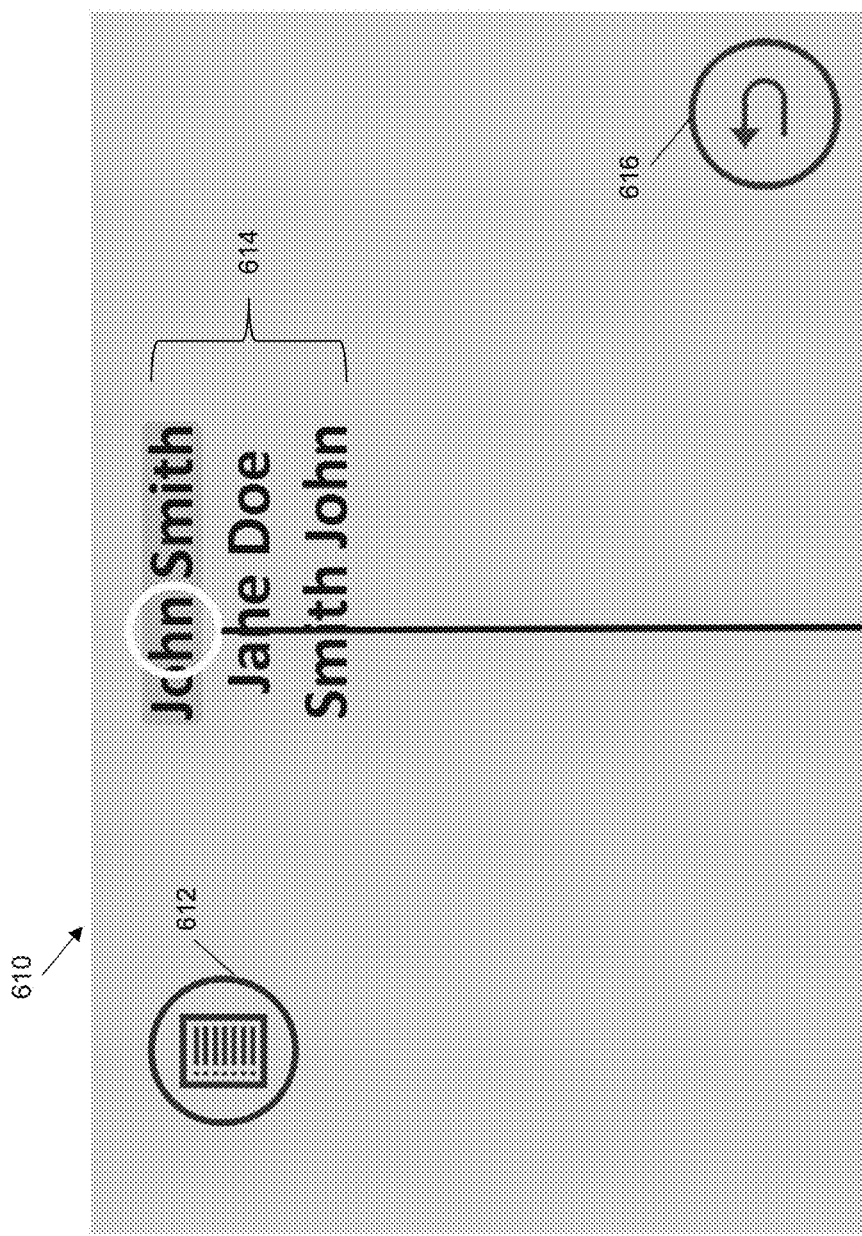
Figure 7C:
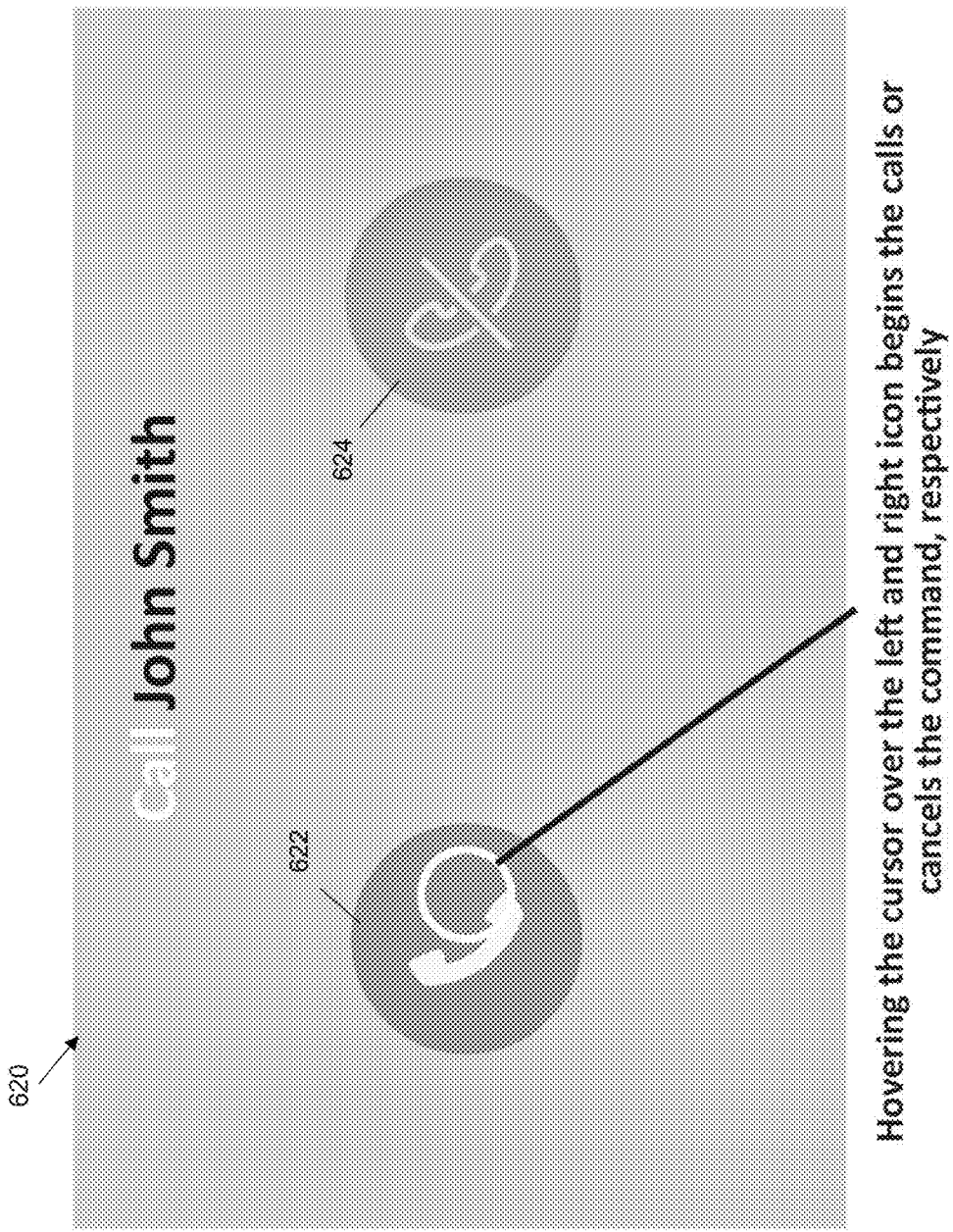
Figure 7E:
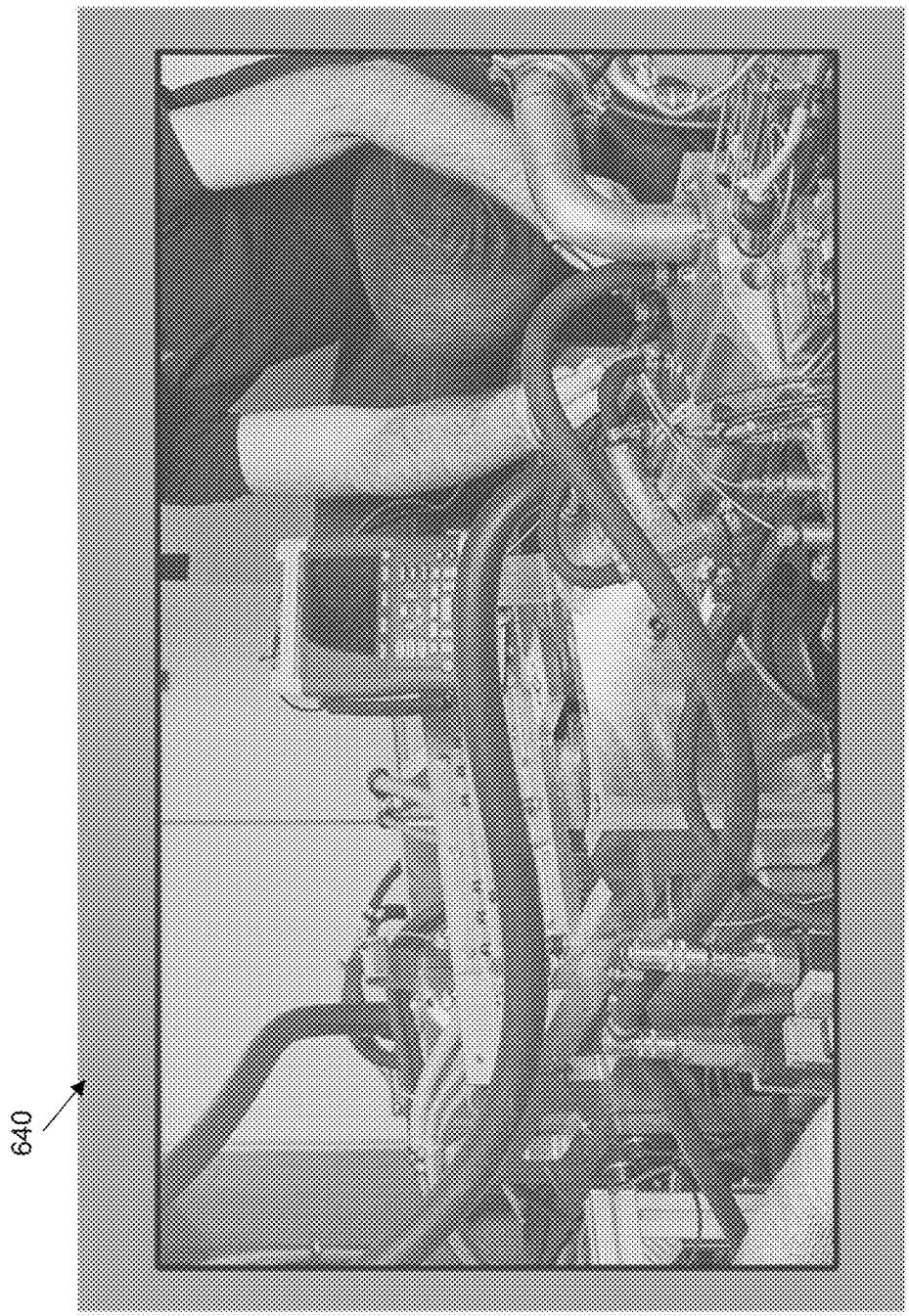
Figure 7F:
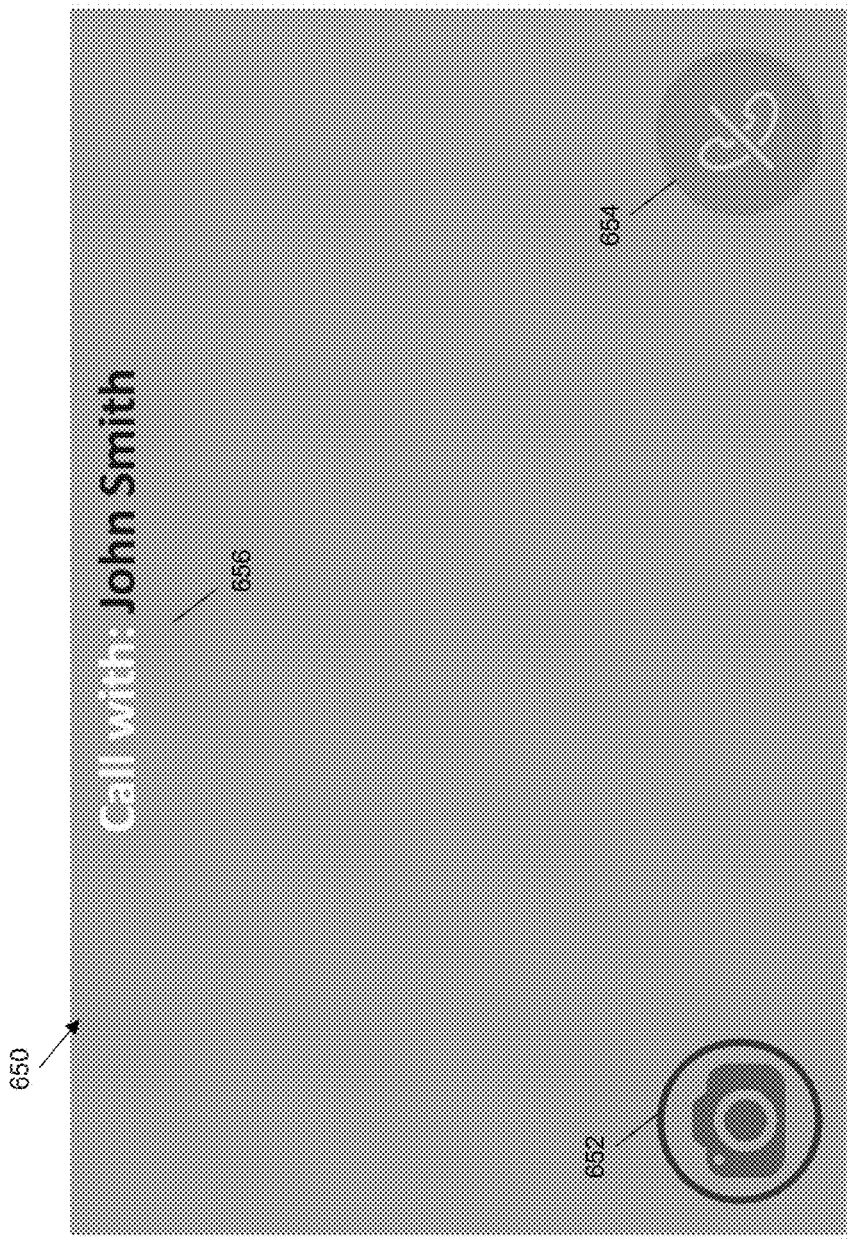
Figure 7G:
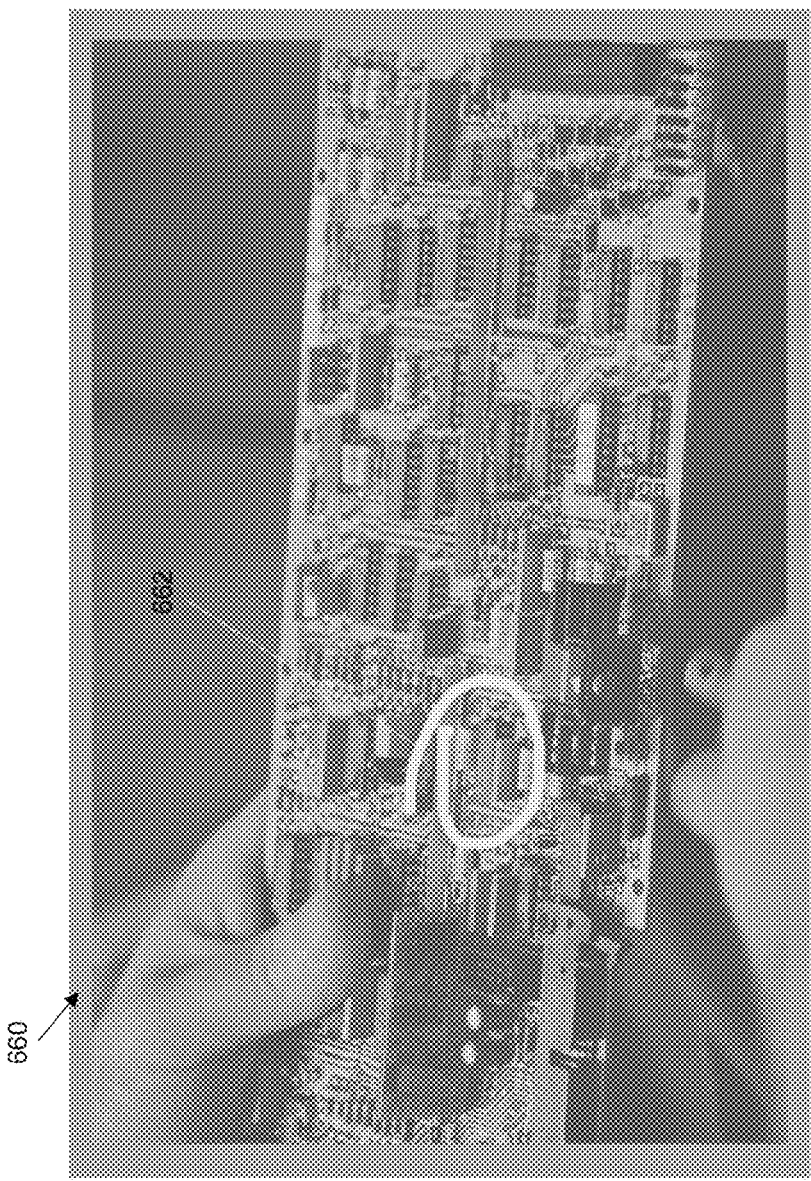
Figure 7I:
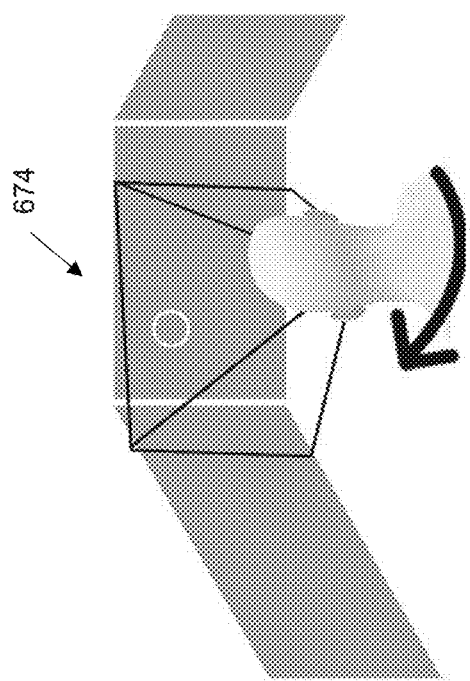
Figure 7H:
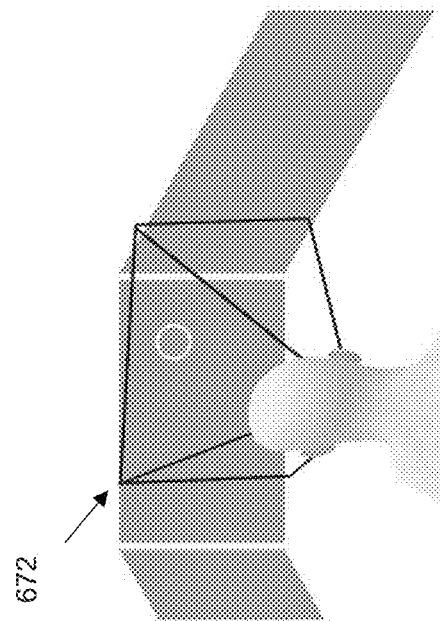
Figure 8:
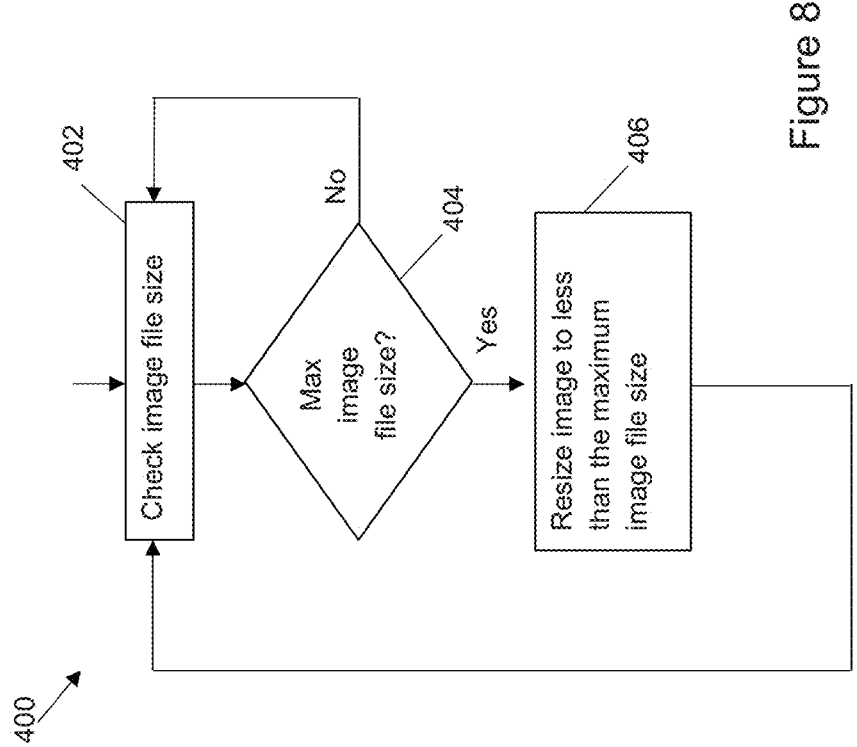
Figure 9:
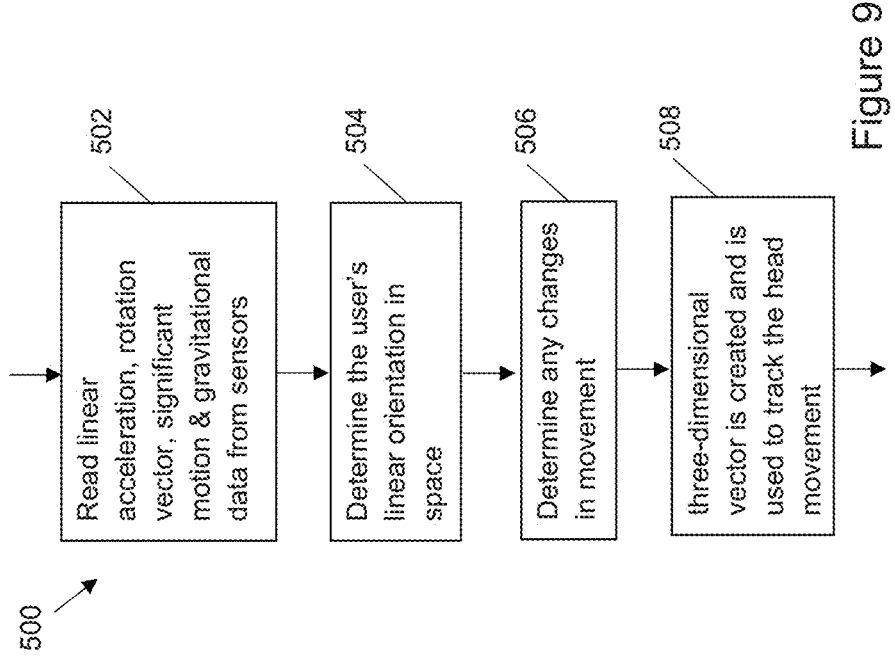

FIG. 1A is a block diagram of an AR system;
FIG. 1B is a more general block diagram of an AR system;
FIG. 2 is a functional block diagram of a AR system;
FIG. 3 is a block diagram of the software architecture of the broker server;
FIG. 4 is a functional block diagram of the broker server;
FIG. 5 is a more detailed block diagram of a system including a wearable device and a user station coupled to the broker server;
FIG. 6 is a simplified block diagram of the functionality of the video management engine;
FIG. 7A is a screen shot showing the list icon (phone book) and settings options following login;
FIG. 7B is a screen shot showing the list of users that are available for a call over the network;
FIG. 7C is a call screen showing a call initial screen with a call icon and an end call icon;
FIG. 7D is diagram showing a "3 screen" view from the user's point of view while wearing an AR headset;
FIG. 7E is an example of an image from the left hand screen such as a live video feed from an AR headset;
FIG. 7F is a screen shot showing the center screen during a call including call information and icons for image capture and call termination;
FIG. 7G is a screen shot of the right hand screen showing an image with an annotation received from a remote user;
FIGS. 7H and 7I show two views from the user's POV and user control of the cursor though head movement;
FIG. 8 is a simplified block diagram of the functionality of the image management engine; and
FIG. 9 is a simplified block diagram of the functionality of the sensor management engine;
To facilitate understanding, identical reference numerals have been used, where possible, to designate identical elements that are common to the figures.

DETAILED DESCRIPTION

Disclosed herein is an Augmented Reality (AR) system that allows for multiple users to use AR headsets to communicate via real-time, Point of View (POV) streaming with a wide range of annotated AR information being displayed onto the user's field of view. The current Augmented Reality software market is mostly geared toward developing apps for tablets/phones (i.e. Augment for the iPhone). This is because phones have much bigger market presence than AR headsets and thus more developer focus. The AR headset market is still at a nascent stage with very few apps that utilize the unique advantages of AR hardware.

FIG. 1A is a block diagram of a basic AR system 20. The system 20 includes two or more user stations 22 and 24 that are coupled in data communication with a broker server 26. The broker server 26 is coupled to an authentications server shown generally by block 28. It should be understood that the broker server 26 and authentication server 28 may be implemented on separate computing platforms or a single computing platform. The user stations 22, 24 generally include a display 30, 50, a communications interface 32, 52, an audio interface 34, 54, one or more processors with associated memory shown generally by blocks 36, 56, a video interface 38, 58, a user interface 40, 60 and sensors such as a gyro and/or accelerometer 42, 62.

User station 22 is coupled to the broker server 26 via a bi-directional communications link shown generally by arrow 72. User station 24 is coupled to the broker server 26 via a bi-directional communications link shown generally by arrow 74. It should be understood that bi-directional communications links 72, 74 are typically network or internet links and may be wired or wireless. From a conceptual standpoint user stations 22 and 24 are generally configured for bi direction communication of audio/video information as shown by dashed line 70. It should be understood that data communications between user stations 22 and 24 is routed through broker server 26 as shown by dashed line 72 and 74. The user stations 22 and 24 may include an AR headset which includes audio hardware such as a microphone and speaker(s) as video hardware such as a video camera and a video display. The AR headset may also include a processor, memory, user interface functionality and other sensors or instrumentation.

FIG. 1B is a more general block diagram of a basic AR system 20. The system utilizes two or more user stations 22, 24 configured with AR hardware to provide real-time, Point-of-View communication between multiple users using an app in the AR headset 80, 100 or a separate computing platform such as a personal digital assistant (PDA) or smart phone 82, 102, tablet 84, 104, laptop 86, 106 or computer 88, 108 via a web browser. The system can generally provide AR features such as transmitting .jpeg/.word/.pdf files directly to the AR headset 80, 100 for display to a user. The user can then pan in and out of these files. The system can also provide AR gesture-control as well as real-time audio communication between users. Real-time, sensor-based information may be directly into Field of View of a user. Screenshots/videos taken from AR headset can be saved with geolocation/time/date.

The system is designed to leverage several industry standard components across multiple hardware platforms includes at least one custom platform. The system is cane be implemented with an HTML5 framework with WebRTC for video peer-to-peer streaming. In general the software architecture can be implanted with a Web application and site. The client and server may use a javascript web architecture utilizing a Node for server functionality and JQuery for the client in an asynchronous fashion except while managing files where the operation will be more synchronous to avoid device blocking. Communication between client and server may be secured using Secure Socket Layer certification of the server. User logins may be managed through a Windows LDAP service. The AR headgear may be Android based and may run an independent app, which will relies on OpenGL for image rendering & AR features.

FIG. 2 is a functional block diagram of an AR system 120. The system 120 includes a STUN/TURN server 122, Node 124, broker server 126, LDAP server 128, client browser 130, Web RTC server 132 and JQuery library 134. The STUN/TURN server 124 is an external public service provided for network address translation. The broker server 126 can utilize Node 122 for HTML requests and LDAP server 128 for authentication of the user credentials. The broker server 126 generally reports connected users to other users and handles initial signaling to the clients for peer-to-peer connection. The broker server 126 is configured to store session files (video, audio, general, and images) for sharing and use per session. The broker server 126 uses the STUN/TURN server 124 for address validation. The client browser or web site 130 also uses STUN/TURN server 124 for address validation. JQuery library 134 uses Javascript for the web side to handle different events, socket IO calls and allows for compatibility across different web browsers.

FIG. 3 is a block diagram of the software architecture of the broker server 126. The broker server software is divided into an operating system layer 140, an execution layer including a Node 142; an API layer 144 and an application layer 146 including a web server. The API layer includes node-static module 148, and HTTPS module 150, socket IO module 152, OS module, LDAPJS module 156 and a file system module 160. Node 142 uses JavaScript to be an event-driven, non-blocking IO model that is highly scalable. The LDAPJS server 156 is a user/password creation server that is separate from the main server for security reasons.

FIG. 4 is a functional block diagram of the broker server 126. It should be understood that any flowcharts contained herein are illustrative only and that other entry and exit points, time out functions, error checking routines and the like (not shown) would normally be implemented in typical system hardware/software. It is also understood that system hardware/software may run continuously after being launched. Accordingly, any beginning and ending points are intended to indicate logical beginning and ending points of a portion of code or hardware function that can be integrated with other hardware or portions of code and executed as needed. The order of execution of any of the blocks may also be varied without departing from the scope of this disclosure. Implementation of these aspects in hardware and/or software is readily apparent and well within the grasp of those skilled in the art based on the disclosure herein.

The server provides a login view as shown by block 170 so that each user may login to the server. Once logged in the user can access a content view as shown by block 172. The software functionality is then divided into several areas; the contacts area, the sessions area, the image area and the secondary area as shown by blocks 174, 176, 178 and 180.

FIG. 5 is a more detailed block diagram of a system including a wearable device 222 and a user station 224 coupled to the broker server 226. The wearable device 222 generally includes a display 230, a communications interface 232 that is coupled to the broker server 226, a microphone and audio interface 234 one or more processors 234 with an associated local memory 244 and an operating system with one or more apps 246, a camera and associated interface 238, a user interface 240 and optionally sensors such as a gyro and/or accelerometer 242. The user device includes generally include a display 250, a communications interface 252 that is coupled to the broker server 226, a microphone and audio interface 254, one or more processors with associated memory shown generally by block 256, a camera and interface 258, a user interface 260 and optionally sensors such as a gyro and/or accelerometer 262.

For example, Epson® BT-300 Smart Glasses are suitable for use as a wearable device available from Epson America, Inc. It should be understood that the wearable device 222 may include a battery as shown generally by block 40. The wearable device generally includes a wearable headset with a headset with a display, camera, earphone, microphone and a hand held controller. The display is generally configured in a 16:9 format with 1280×720 pixels supporting 24 bit color. The communications interface 232 may support wired communications such as USB or wireless communications such as Wi-Fi (IEEE 802.11a/b/g/n/ac) or Miracast (Source/Sink), Bluetooth or any other wireless technology. The headset may include sensors 242 such as GPS, geomagnetic sensors, accelerometer sensors, gyroscopic sensors, and ambient light sensors. The camera is generally configured to generate video data in a variety of video standard such as MP4 (MPEG-4/H.264+AAC), MPEG-2 (H.264+AAC), VP8 or the like. The camera is also generally configured to generate image data in a variety of still image formats including JPEG, PNG, BMP, GIF or the like. The microphone is generally configured to generate audio data in a variety of formats including WAV, MP3, AAC and the like. The processor 236 may be configured to run an operating system including Android® available from Google Inc. The user interface generally includes a hand held controller with a plurality of buttons or keys including a direction pad (right, left, up and down), enter key, home key, back key, history key, track pad, power key, volume up/down keys, SD memory slot and a connector to couple the controller to the headset. The battery and processor are generally located within the controller housing. 100381 The broker server 226 is configured with a user interface 270, a connection management engine 272, a video server 274, an image server 276 and memory 280. The memory may include one or more databases associated with each user. The user interface 270 allows the users to login to the system provides user access to various system functions. The video server 274 manages the flow of video data between the wearable device 222, user station 224 and broker server 226. The image server manages the flow of still image data between the wearable device 222, user station 224 and broker server 226.

Video Management Engine: Recording Large Image Files

FIG. 6 is a simplified block diagram of the functionality of the video management Engine 300. It should be understood that any flowcharts contained herein are illustrative only and that other entry and exit points, time out functions, error checking routines and the like (not shown) would normally be implemented in typical system hardware/software. It is also understood that system hardware/software may run continuously after being launched. Accordingly, any beginning and ending points are intended to indicate logical beginning and ending points of a portion of code or hardware function that can be integrated with other hardware or portions of code and executed as needed. The order of execution of any of the blocks may also be varied without departing from the scope of this disclosure. Implementation of these aspects in hardware and/or software is readily apparent and well within the grasp of those skilled in the art based on the disclosure herein.

As shown in FIG. 5, the wearable device 222 is configured to record and transmit video data to the broker server for storage in the broker server memory 280. The camera and interface 238 is generally configured to generate a video image in at least one file format as discussed above. The local memory 244 is configured to store the video data during recording. The local memory 244 has a maximum video file size based on the amount of local memory available. For example, the maximum video file size for Epson® BT-300 Smart Glasses is typically 2 GB. The wearable device may also have a maximum image size for still images.

As shown in FIG. 6, in order to support video files in excess of the maximum video file size. The video management engine 300 is configured as an app running on the wearable device processor. The video management engine first determines the memory capacity of the wearable device and sets this value equal to the maximum video file size. The video management engine monitors the video file size as show generally by block 302. As the video is generated and the maximum video file size is reached this is detected as shown by block 304. The video data file is then transferred to the broker server memory 280 as shown by block 306. The video data file is then deleted from the local memory 244 to make room for additional video data as shown by block 308. This allows the system to record video data files of virtually any size limited only by the size of the broker server memory 280.

In order to initiate a video recording, the user opens an app on the headset and logs in (verified through LDAP server). FIG. 7A is a screen shot 600 showing the list icon 602 (phone book) and settings icon 604 that are available after the user logs in. The user can select the list icon 602 to display a list of available users and establish a call. FIG. 7B is a screen shot 610 showing the list of users 614 that are available for a call over the network. A return icon 616 is also provided so the user can return the previous screen. FIG. 7C is a call screen 620 showing an initial call screen with a call icon 622 and an end call icon 624. In this example, the user is initiating a call with user John Smith. By selecting the call icon 622 the user then connects with the second user via the network (through broker server).

It should be understood that the AR headset may provide multiple screens from the wearer's perspective. For example, FIG. 7D is diagram 630 showing a "3 screen" view from the user's POV while wearing an AR headset. The left hand screen 632 is configured to display video or image data. The right hand screen 634 is configured for data such as menus and the like. The center screen 636 can be mostly clear so the wearer may see in front of them but may also display call information and icons for use during a call. FIG. 7E a screen shot of the left hand screen 640 showing an image from a live video call with a contact. FIG. 7F is a screen shot 650 showing the center screen during a call including call information 656 and icons for image capture 652 and call termination 654. FIG. 7G is a screen shot 660 of the right hand screen showing an image with an annotation 662 received from a remote user. The user may click on Video Recording or Image Capture to save an .mp4 or .jpeg file of his POV as shown in FIG. 7E. After the user selects video recording, the video management engine continually checks to make sure the file being captured does not exceed the local memory capacity. The video management engine checks the maximum video file size by determining the size of the local memory. For the Epson® BT-300 Smart Glasses this value is typically 2 GB. If a recorded file reaches the maximum video file size allowed by the local memory, then the file is automatically cut. The video file is then sent to the broker server. The video management may also pass security credentials and the file into the user's database on the broker server. The video file is then deleted from the local memory thus re-opening the wearable device for more file captures. The recording automatically continues again from the end of the saved file. Each file follows this procedure. The GPS location may also be recorded at the start of the session. If user does not exceed max file size allowed, then at the end of each session, each file is uploaded & passes through the server protocol and is saved in the user's database. Each saved file may have the name/date/GPS location as the name of its file.

Image Management Engine: Exchanging Large Image Files

In some cases, problems arise when sending large image files to a wearable device (such as Epson® BT-300 Smart Glasses). Such devices often have a maximum image size that is limited due to a variety of factors such as the lack of a dedicated graphics processing unit (GPU) and therefore lack of core OpenGL image rendering features. FIG. 8 is a simplified block diagram of the functionality of the image management engine 400. The image management engine 400 is configured as an app running on the wearable device processor. In this example assume that the $2^{nd}$ user sends a 5000×3000 (5k by 3k) image from desktop based user device to the wearable device. Also assume that the maximum image size for the wearable device is 1000×1000. Under these conditions, the wearable device cannot process this large image (in excess of the maximum image size). The image management engine determines the image size as shown by block 402. The image management engine then checks to see if the image file size exceeds the maximum image file size as shown by block 404. If the image size is too large the image management engine resizes the image to less than the maximum image file size as shown generally by block 406. In one example the image management engine converts image to base 64 encoding. The image can then be converted/correlated to binary encoding which uses 8 bits per byte & saves roughly 30% file size. The image can be split into tiles that can be processed by the Epson® BT-300 Smart Glasses. The image tiles are then re-aligned into one image in the Epson® BT-300 Smart Glasses prism display.

Example Use Case: Image Capture and Annotation

1—User A having issue fixing mechanical system & puts on a wearable device (AR headset).

2—User A accesses the user interface via the controller on the AR headset and logs in via username & password as is well known in the art.

3—User A clicks on list icon & sees other connected users that are online as generally shown in FIG. 7A.

4—User B e.g., sitting at desk in New York, logs onto website & inputs his username & password as is well known in the art.

5—User B sees User A online & clicks on User A to initiate a connection between the two users as generally shown in FIGS. 7B and 7C.

6—User A accepts User's B's call request via nodding.

7—User B sees User A's real-time POV as generally shown in FIG. 7E.

8—User B has live audio communication with User A.

9—User B can take a screenshot of User A's POV.

10—User B can then annotate the screenshot of where to fix mechanical device.

11—User B can then send the annotated screenshot into User A's POV as generally shown in FIG. 7G.

12—User A can then zoom into the screenshot to accurately see the annotation.

13—User A can then exit screenshot make any repairs.

14—User C can also log in and click on User A to see User A's POV w/live audio.

15—All video reconlings/screenshots/files used during this session are saved in database with each file being tagged with geo-location/time/date.

Example Use Case: Head Tracking User Control

FIG. 9 is a simplified block diagram of the functionality of the sensor management engine 500. The sensor management engine 500 is configured as an app running on the wearable device processor. Use of head tracking control generally proceeds as follows:

1. User A accesses the user interface via the controller on the AR headset, logs in and views an image file/annotated image that is sent to him.

2. Instead of user using the buttons or track pad on the AR headset controller to move around the image, sensor-fusion is utilized through integration of the AR headset gyroscope/accelerometer. FIGS. 7H and 7I show two views 672 and 674 from the user's POV and user control of the cursor though head movement.

3. As shown in FIG. 9 at block 502, the sensor management engine reads the linear acceleration, rotation vector, significant motion & gravitational. Data.

4. The sensor management engine determines the user's linear orientation in space as shown by block 504.

5. The sensor management engine then determine any changes in movement as shown by block 506.

A three-dimensional vector using this data is created and is used to track the head movement as shown by block 508

The vector is configured within the image viewer file system to match in any rotational motion taken by the user. When the user moves head up and top of image file is seen-likewise, user move side-ways or down and image file is moved accordingly. No need for use of button controls on AR headset. A rapid head movement (determined based on accelerometer data) forward allows for a zoom in whereas a similar movement backward would zoom back out. User can still utilize existing AR smart-glass button controls but this feature enables for a more hands-free shameless AR experience.

One-way vs Two-way Augmented Reality Point-of-View Streaming

In this example User A logs into and connects to User B. The broker server checks security credentials via LDAP server & then establishes a connection. The user is presented with three options:

1. User A has the option for one-way streaming which would allow for User B to see User A's POV but User A's own view would be unencumbered.

2. User A has option for one-way User B streaming which would allow for User A to see User B's POV but User B's own view would be unencumbered 3. User A has option for two-way viewing which means that both User A and User B would see each other's POV.

If option 1 is chosen, then App server ends all information transfer except for audio stream from User B. This includes the stoppage of GPS location data of User B.

If option 2 is chosen, then App server ends all information transfer except for audio stream from User A. This includes the stoppage of GPS location data of User A.

If option 3 is chosen, then App server continues normal procedure of connecting live audio/video between the user's and displaying each other info on the User Interface.

It should be understood that many variations are possible based on the disclosure herein. Although features and elements are described above in particular combinations, each feature or element can be used alone without the other features and elements or in various combinations with or without other features and elements. The digital processing techniques disclosed herein may be partially implemented in a computer program, software, or firmware incorporated in a computer-readable (non-transitory) storage medium for execution by a general-purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application-Specific Integrated Circuits (ASICs), Field-Programmable Gate Arrays (FPGAs) circuits, any other type of integrated circuit (IC), and/or a state machine.

What is claimed is:

1. An augmented reality system for communication between a plurality of user devices including wearable devices and non-wearable user stations, the system comprising
    a wearable device including a headset and a controller, the headset having a display, camera, earphone and microphone, the controller being configured with a local memory having a maximum video file size, the camera being configured to record video data and store the video data in the local memory;
    a server configured for data communication with the plurality user devices, the server having a server memory and plurality of user accounts, each user account being associated with at least one of the plurality of user devices, the server being configured to establish data connection between the wearable device and at least one other user device;
    a video management engine located on the controller, the video management engine being configured to determine whether the video data stored in the local memory equals the maximum video file size and in this event, the video management engine being configured to transfer the video data to the server for storage in the server memory and then delete the video data from the local memory; and
    an image management engine located on the controller, the server being configured to transfer image data to the wearable device, the wearable device controller having a maximum image size, the image management engine being configured to determine if the image data exceeds the maximum image size and in this event, resize the image to less than the maximum image size.

2. The system of claim 1 further comprising an authentication server configured to authenticate users.

3. The system of claim 1 wherein the user station has a separate computing platform including at least one of a personal digital assistant (PDA), smart phone, tablet, laptop or desktop computer.

4. The system of claim 1 wherein the wearable device includes at least one sensor configured to generate sensor data based on movement of the headset.

5. The system of claim 4 further comprising a sensor management engine located on the controller, the sensor management engine being configured to manipulate an image on the display based on the sensor data.

6. The system of claim 1 wherein the image management engine is configured to convert the image to base64 encoding.

7. The system of claim 6 wherein the image management engine is configured to convert the base64 encoded image to a binary format with 8 bits per byte.

8. The system of claim 7 wherein the image management engine is configured to convert the binary image into tiles.

9. The system of claim 1 wherein the image data includes annotations.

10. The system of claim 1 wherein the server is configured to support one-way communication between user devices.

11. The system of claim 1 wherein the server is configured to support two-way communication between user devices.

12. The system of claim 1 wherein the server includes a database associated with each user for storage of the video data and image data.

13. A method for augmented reality communication between a plurality of user devices including wearable devices and non-wearable user stations, the method comprising providing a wearable device including a headset and a controller, the headset having a display, camera, earphone and microphone, the controller being configured with a local memory having a maximum video file size, the camera being configured to record video data and store the video data in the local memory;

providing a server configured for data communication with the plurality user devices, the server having a server memory and plurality of user accounts, each user account being associated with at least one of the plurality of user devices, the server being configured to establish data connection between the wearable device and at least one other user device;

providing a video management engine located on the controller, the video management engine being configured to determine whether the video data stored in the local memory equals the maximum video file size and in this event, the video management engine being configured to transfer the video data to the server for storage in the server memory and then delete the video data from the local memory; and providing an image management engine located on the controller, the server being configured to transfer image data to the wearable device, the wearable device controller having a maximum image size, the image management engine being configured to determine if the image data exceeds the maximum image size and in this event, resize the image to less than the maximum image size.

14. The method of claim 13 further comprising providing an authentication server configured to authenticate users.

15. The method of claim 13 wherein the user station has a separate computing platform including at least one of a personal digital assistant (PDA), smart phone, tablet, laptop or desktop computer.

16. The method of claim 13 wherein the wearable device includes at least one sensor configured to generate sensor data based on movement of the headset.

17. The method of claim 16 further comprising a sensor management engine located on the controller, the sensor management engine being configured to manipulate an image on the display based on the sensor data.

18. The method of claim 13 wherein the image management engine is configured to convert the image to base64 encoding.

19. The method of claim 18 wherein the image management engine is configured to convert the base64 encoded image to a binary format with 8 bits per byte.

20. The method of claim 19 wherein the image management engine is configured to convert the binary image into tiles.

21. The method of claim 13 wherein the image data includes annotations.

22. The method of claim 13 wherein the server is configured to support one-way communication between user devices.

23. The method of claim 13 wherein the server is configured to support two-way communication between user devices.

24. The method of claim 13 wherein the server includes a database associated with each user for storage of the video data and image data.

* * * * *